June 19, 1951 F. R. HORMANN 2,557,287
DEVICE FOR CONTROLLING TIME DURATION
FOR OPERATION OF A VALVE
Filed April 1, 1949
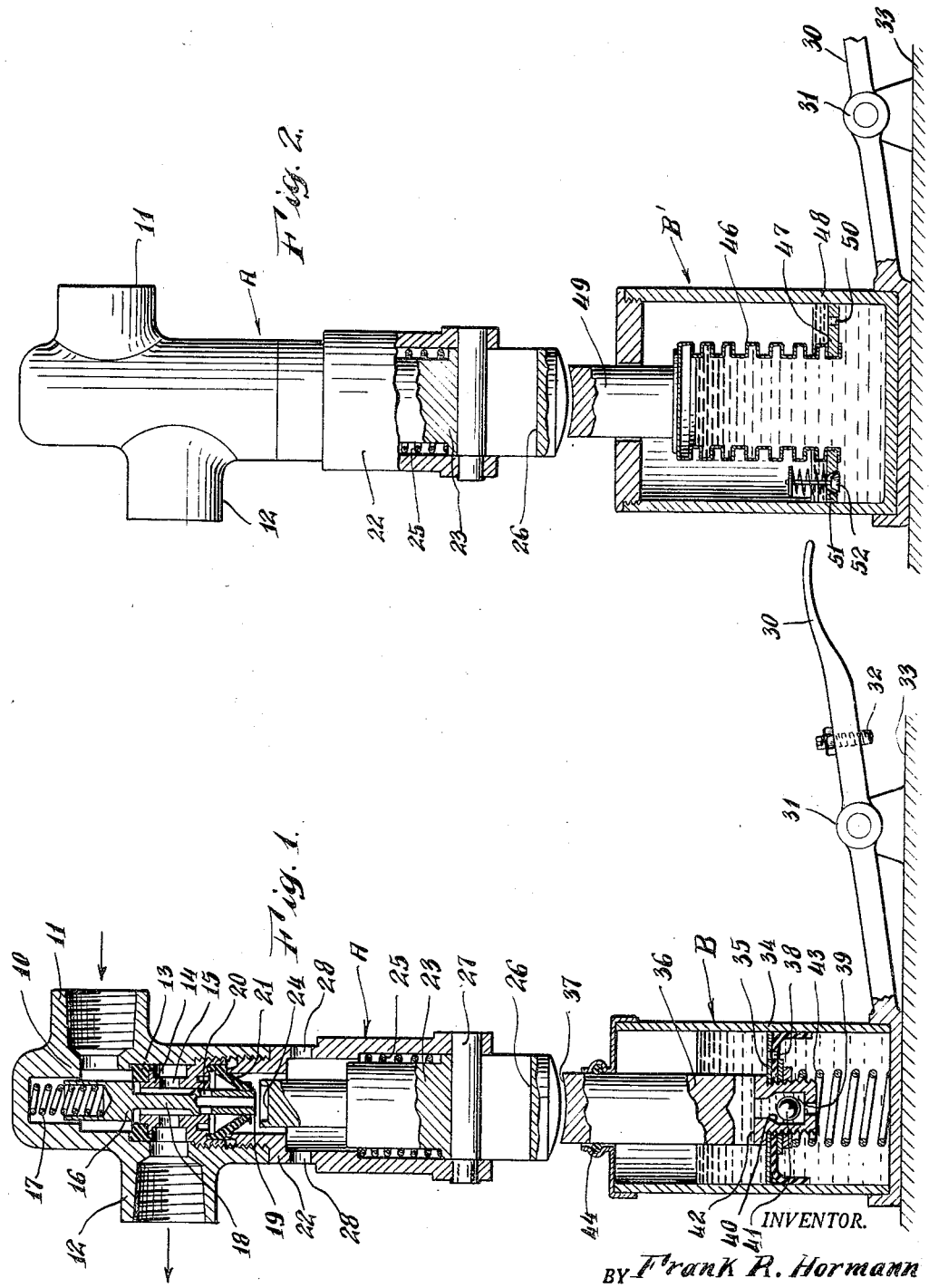
INVENTOR.
BY Frank R. Hormann
Fraser, Myers & Manley
ATTORNEYS Patented June 19, 1951

2,557,287

UNITED STATES PATENT OFFICE 2,557,287

DEVICE FOR CONTROLLING TIME DURA-
TION FOR OPERATION OF A VALVE

Frank R. Hormann, Brooklyn, N. Y., assignor to
Scovill Manufacturing Company, Waterbury,
Conn., a corporation of Connecticut Application April 1, 1949, Serial No. 84,942

4 Claims. (Cl. 161—7)

1

The present invention relates to means for controlling the time duration for operation of a valve or other mechanism and aims to provide certain improvements therein.

Primarily the device of the present invention is designed and intended for operation of a three-way fluid pressure valve to control the time interval during which such valve may be held open. More particularly the device of the present invention is intended for use in a pneumatic press control mechanism of the general type disclosed in United States Patents Nos. 2,253,544 and 2,423,482, wherein two hand-operated valves in a pneumatic circuit are adapted to be substantially simultaneously operated to permit a puff of compressed air to pass through the pneumatic circuit and operate a pilot valve which, in turn, admits fluid pressure to an actuating cylinder for operating the clutch of a press or the like and wherein a cut-out valve is employed to prevent one-hand operation, for example, by tying down and holding open one of the hand-operated valves.

According to the present invention, in order to prevent one-hand operation by tying down one of the hand-operated valves and eliminate the cut-out valve, the three-way valves are each controlled by a hydraulic dash-pot. The structure of the dash-pot and the operative relation thereof to a valve are such that a quick movement of the dash-pot, followed by the release thereof, will momentarily open the valve to permit a puff of compressed air to pass therethrough, and wherein a too slow movement of the dash-pot or the holding thereof in valve-operating position too long will result in the diaphragm-rod of the dash-pot being returned to non-operating position. The invention is also applicable to controlling the time interval during which a spring-seated valve may be held open from a fraction of a second to several seconds by varying the size of the orifice through the diaphragm in the dash-pot and by controlling the extent of movement of the dash-pot relative to the valve after the latter has been opened. The invention will be better understood from the detailed description which follows, when considered in connection with the accompanying drawings showing two embodiments of the invention, and wherein:

Figure 1 is an axial section, with parts thereof in elevation, through a valve and a dash-pot control device embodying my invention.

Fig. 2 is a view similar to Fig. 1 showing a modified dash-pot construction.

Although my invention is primarily intended for use in operating the hand-operated valves of a

2 press fluid control unit of the types disclosed in the aforementioned patents, it will be appreciated that it is capable of use in controlling the time interval during which any spring-seated valve may be held open or other movable elements may be held in one of two predetermined positions.

In the drawings I have shown the invention as applied to a three-way valve A of the type described in the aforementioned patents, said valve primarily differing from the valve B of said patents by the omission of the mushroom hand-operating head thereof. To avoid reference to the aforementioned patents, however, the valve A is herein specifically described and consists of a hollow casing 10 having lateral tubular offsets or projections 11 and 12 providing induct and educt openings, respectively, said casing having therein between the lateral offsets a shoulder upon which is mounted a valve-contacting seat 13 which is held in place by a tubular plug 14 having lateral openings 15 therein, the said plug being screw-threadedly or otherwise held in position within the casing. Mounted within the casing for engagement with the packing seat 13 is a valve check member 16, the lower portion of which is hollowed out and encloses a helical spring 17 for normally holding the valve against its seat. The valve check 16 above the seating portion thereof is formed with an axial pin 18, the upper end 19 of which is of tubular form and of a diameter to snugly slide through the axial opening in the plug 14, and said tubular portion of the pin at its lower end is formed with lateral openings 20. To insure against leakage and to provide an air seal between the top of the tubular plug 14 and the top of the hollow portion 19 of the pin 18, said parts are connected together by a cone-shaped packing 21. Any suitable means may be employed for holding this packing in contact with said parts and, as herein shown, the packing, which is formed as a separate part, has a sliding fit with the hollow portion 19 of the valve pin 18 and is held in clamping engagement with the tubular plug 14 by a tubular member 22 which screw-threadedly engages within the casing 10. Mounted for telescopic movement within the tubular member 22 is a plunger 23, the inner end of which is recessed as at 24 to engage over and seal the open end of the hollow portion of the valve pin when the plunger is depressed in the act of unseating the valve check 16. The plunger 23 is of a length to extend beyond the lower end of the tubular member 22 and is normally urged outwardly of said member by a helical spring 25 mounted between a shoulder within the tubular member 22 and a shoulder on the plunger 23, and for holding the plunger 23 against separation from the tubular member 22 the plunger is formed with a slot 26 through which extends a pin 27 carried by the tubular member 22. The tubular lateral offsets 11 and 12 are each internally threaded and adapted for connection with suitable hose fittings. The tubular member 22 is also formed with lateral openings or vents 28 which, it will be observed, provide open communication through the tubular portion 19 of the valve check pin, the lateral openings 15 in the tubular plug 14 and the bore through the lateral offset 12 when the check valve 16 is seated. When the check valve 16 is unseated it will be apparent that this open communication is cut off by the seal provided by the engagement of the recess 24 in the upper end of the plunger 23 with the coned packing 21. The valve casing 10 and the tubular member 22 which are screw-threadedly connected together may be considered as a housing for the valve and said housing is adapted to be fixedly mounted so that the plunger thereof can be moved to unseat the valve therein.

For moving the plunger 23 to unseat the valve 16 I provide a control device B consisting essentially of a dash-pot mounted or carried by an operating lever 30 for moving the dash-pot bodily from a normally inoperative position, shown in Fig. 1, to a predetermined operative position in which an element of the dash-pot hereinafter described, engages and moves the plunger 22 to unseat the valve 16. The operating lever 30 is pivotally mounted in a bearing 31 and is provided with an adjustable screw 32, the end of which, upon contacting the base 33 or any other suitable support upon which the control device is mounted, will limit the extent of upward movement of the dash-pot. The dash-pot consists of a casing 34 adapted to be filled or partially filled with a hydraulic liquid and having mounted in said casing for movement through said liquid, a diaphragm 35 herein shown as a piston, said diaphragm having a diaphragm-rod 36 which, at its inner end, extends through the piston, and at its outer end extends through the top of the casing 34. The diaphragm-rod 36 has a concave end face 37 adapted to engage the convex end of the plunger 23. The diaphragm or piston 35 is formed with a restricted orifice 38 through which the hydraulic fluid may pass from one to the other side of the diaphragm and the diaphragm-rod which extends through the diaphragm is formed at its inner end with a passage 39 therethrough of greater cross-sectional area than the orifice 38, said passage being formed with a valve seat 40 against which a ball valve 41 is adapted to seat. The opening 39 is continued through and communicates with a transverse passage 42 in the diaphragm-rod. The diaphragm or piston is preferably held in a predetermined position within the casing 34 by a light coil-spring 43 which is substantially weaker than the spring 25 which normally holds the plunger 23 projecting from the valve housing. If desired, suitable packing means 44 may be provided between the diaphragm-rod 36 and the top of the casing 34.

In Fig. 2 of the drawings I have shown a control device B', which, although operating on the same principle as the control device B, has a different form of dash-pot. In said figure the diaphragm of the dash-pot is in the form of a lightweight metallic bellows 46, the inner end of which is secured to a diaphragm plate 47 which is fixedly held in a casing 48 and the outer end of which carries a diaphragm-rod 49. The diaphragm plate 48 is formed with a restricted orifice 50 corresponding to the orifice 38 of Fig. 1 and with an enlarged opening 51 corresponding to the opening 39 of Fig. 1. Controlling the opening 50 is a spring-biased check valve 52 corresponding in its function to the ball valve 41 of Fig. 1.

In the operation of the device for controlling the time duration for operation of the valve A, the parts are mounted in the relation shown, air under pressure being adapted to enter and leave the valve casing in the direction of the arrows in Fig. 1. By pressing down on the free end of the operating lever 30, the dash-pot is raised bodily, the outer end of the diaphragm-rod 36 engages and raises the plunger 23 which, in turn, raises the valve rod 18 to unseat the valve 16. During the movement of the plunger 23 by the diaphragm-rod 26 a small amount of liquid will pass through the orifice 38 from the lower to the upper side of the diaphragm or piston. If the operating lever is released immediately after unseating the valve 16, the weight of the dash-pot will return it to its normal inoperative position, the plunger 23 will be returned to its normal position by the spring 25 and the valve 16 will close owing to the force of spring 17 acting thereon. Under the described operation, the valve 16 will remain open only momentarily and only a puff of compressed air will surge through the valve. If the operating lever 30 is moved down slowly to its limiting operative position or if when moved down rapidly it is held too long in said limiting position, the amount of liquid passing through the orifice 38 will be greater and a relative movement will take place between the diaphragm-rod and the casing. However, immediately after the valve 16 is unseated, the plunger 23 will be returned to its normal position by virtue of the fact that its biasing spring 25 is stronger than the spring 43 of the dash-pot, the valve 16 will close, and the diaphragm-rod 36 will be moved to a non-operating position. In other words only a puff of compressed air will surge through the valve under such condition. Of course, when the operating lever is released the dash-pot will, owing to its weight, return to its inoperative position and liquid from the upper side of the diaphragm will rapidly flow to the lower side to reestablish the equilibrium of the piston. An analogous action will take place when the dash-pot of Fig. 2 is operated in the manners set forth.

By restricting the size of the orifice 38 it will be apparent that the resistance to the flow of liquid therethrough will be increased, so that when the valve is opened in any of the manners aforementioned, the time required for the plunger to move the diaphragm-rod to inoperative position will be governed by the size of the orifice in the diaphragm. By the same token, the size of the orifice in the diaphragm may also control the time required for the dash-pot to be moved from its inoperative to its limiting operative position, which factor would also have to be taken into consideration in determining the time interval during which the valve would remain open, since in such case the valve would be opened before the dash-pot reaches its limiting operative position.

Obviously, instead of the control device being used to open a valve it may operate upon any movable element of a mechanism, which element is spring-biased in one direction to a limiting position.

While I have shown and described two embodiments of my invention it will be understood that changes in the specific construction of parts may be made within the range of engineering or mechanical skill without departing from the spirit of the invention as claimed.

What I claim is:

1. In combination, a fixed valve housing having therein a valve which is spring-biased to closed position and is unseatable from the exterior of the housing, a plunger within said housing independent of the valve and movable for unseating the valve, a spring biasing said plunger away from the valve to a limiting position, and a control device for moving said plunger against its spring bias away from its limiting position for unseating the valve for a predetermined interval of time, said control device comprising a dash-pot which is bodily movable relatively to the plunger from a normally inoperative position to a predetermined limiting operative position, said dash-pot consisting of a casing containing a liquid, a diaphragm movable in said liquid, spring means biasing said diaphragm in a direction opposed to the spring-biasing force on the plunger, a diaphragm rod movable by the diaphragm and extending through the casing and adapted for movement relatively thereto, and means for moving the dash-pot so that the diaphragm rod thereof will operate to move the plunger to unseat the valve, the spring bias on the plunger being greater than the spring bias on the diaphragm, whereby, when the dash-pot has been moved to its limiting operative position the plunger will move the diaphragm rod against the force of the diaphragm spring and the valve will close under its biasing spring action.

2. The combination according to claim 1 wherein the dash-pot is carried by a lever which is pivotally mounted for bodily movement so that the diaphragm rod can be brought into unseating engagement with the valve plunger when the lever is moved about its pivot.

3. The combination according to claim 1 wherein means are provided for limiting the movement of the dash-pot to a predetermined operative position.

4. The combination according to claim 3 wherein the means for limiting the movement of the dash-pot to a predetermined operative position is adjustable.

FRANK R. HORMANN.

REFERENCES CITED

The following references are of record in the file of this patent:

UNITED STATES PATENTS

| Number | Name | Date |
|---|---|---|
| 1,062,580 | Bolle | May 27, 1913 |
| 1,273,140 | Brooks | July 23, 1918 |

FOREIGN PATENTS

| Number | Country | Date |
|---|---|---|
| 712,899 | France | Aug. 3, 1931 |